(12) United States Patent
Wong et al.

(10) Patent No.: US 11,252,582 B2
(45) Date of Patent: Feb. 15, 2022

(54) METHOD FOR DETERMINING START TIME OF A PHYSICAL DOWNLINK CONTROL CHANNEL

(71) Applicant: Alcatel Lucent, Boulogne Billancourt (FR)

(72) Inventors: Shin Horng Wong, Chippenham (GB); Sigen Ye, New Providence, NJ (US); Yu Chen, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/024,409

(22) PCT Filed: Sep. 27, 2013

(86) PCT No.: PCT/CN2013/084425
§ 371 (c)(1),
(2) Date: Mar. 24, 2016

(87) PCT Pub. No.: WO2015/042856
PCT Pub. Date: Apr. 2, 2015

(65) Prior Publication Data
US 2016/0234810 A1 Aug. 11, 2016

(51) Int. Cl.
*H04W 24/02* (2009.01)
*H04W 76/27* (2018.01)
*H04L 5/00* (2006.01)
*H04W 48/12* (2009.01)
*H04W 72/04* (2009.01)
(Continued)

(52) U.S. Cl.
CPC ........... *H04W 24/02* (2013.01); *H04L 5/0053* (2013.01); *H04L 5/0094* (2013.01); *H04W 48/12* (2013.01); *H04W 72/042* (2013.01); *H04W 72/0446* (2013.01); *H04W 72/085* (2013.01);
(Continued)

(58) Field of Classification Search
None
See application file for complete search history.

(56) References Cited

U.S. PATENT DOCUMENTS

2008/0081629 A1    4/2008  Piipponen
2011/0038277 A1*   2/2011  Hu ................. H04L 1/0026
                                                    370/252
(Continued)

FOREIGN PATENT DOCUMENTS

CN    1992966 A      7/2007
CN    101588625 A    11/2009
CN    102740237 A    10/2012

OTHER PUBLICATIONS

International Search Report for PCT/CN2013/084425 dated Jul. 9, 2014.

*Primary Examiner* — Chi H Pham
*Assistant Examiner* — Raul Rivas
(74) *Attorney, Agent, or Firm* — Fay Sharpe LLP

(57) ABSTRACT

A method is provided for a UE to determine the start time of the downlink control channel for M2M communication in LTE systems. The method comprises a UE receiving a parameter set to determine the start time of the (E)PDCCH from the eNB; calculating the start time based on the received parameter set from the eNB; combining/decoding the repetitive (E)PDCCHs; and sending the feedback information to confirm/reject the reception of the (E)PDCCH.

18 Claims, 2 Drawing Sheets

(51) Int. Cl.
*H04W 72/08* (2009.01)
*H04W 74/08* (2009.01)
*H04W 88/02* (2009.01)
*H04W 88/08* (2009.01)

(52) U.S. Cl.
CPC ....... *H04W 74/0833* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2011/0080962 A1* | 4/2011 | Blankenship | H04B 7/2606 375/259 |
| 2011/0158116 A1 | 6/2011 | Fenny | |
| 2011/0199975 A1* | 8/2011 | Wu | H04L 1/1812 370/328 |
| 2011/0243111 A1 | 10/2011 | Andgart et al. | |
| 2013/0039284 A1* | 2/2013 | Marinier | H04L 5/001 370/329 |
| 2013/0081026 A1* | 3/2013 | Malkamaki | H04L 5/0053 718/102 |
| 2013/0094457 A1* | 4/2013 | Seo | H04W 72/042 370/329 |
| 2014/0226542 A1* | 8/2014 | Gupta | H04B 15/00 370/280 |
| 2014/0301359 A1* | 10/2014 | Seo | H04L 5/0007 370/330 |
| 2015/0049685 A1* | 2/2015 | Chen | H04L 5/0053 370/329 |

* cited by examiner

METHOD FOR DETERMINING START TIME OF A PHYSICAL DOWNLINK CONTROL CHANNEL

FIELD OF THE INVENTION

The present application generally relates to communication technology, and more particularly relates to determining the start time of a physical downlink control channel.

BACKGROUND OF THE INVENTION

PDCCH (Physical Downlink Control Channel) or Enhanced PDCCH (EPDCCH) in LTE carries UE-specific scheduling assignments for downlink resource allocation, uplink grants, physical random access channel response, UL power control commands, and common scheduling assignments for signaling messages.

Machine Type Communication (MTC) is a work item being studied in 3GPP (3$^{rd}$ Generation Partnership Project), targeting cellular based Machine to Machine communication (M2M). The machine devices may be located in the basement with higher penetration loss than the current cell edge UEs. To support these devices, coverage enhancement techniques are needed.

One of the techniques to enhance the coverage is the repetition. At the receiver side, the repetitive control information packets are combined and decoded for better performance.

OBJECT AND SUMMARY OF THE INVENTION

In order to combine and decode the repetitive physical downlink control channels, the receiver side needs to know the placement of the repetitions.

It is an object of the present invention to address the above problems. In particular, it is an object of the present invention to provide a method enabling the UE to determine the start time of the physical downlink control channel for M2M communication in LTE systems.

One embodiment of the present application provides a method comprising sending, by a base station, a configurable parameter set to a user equipment to facilitate determination of start time of downlink control channel; and sending to the user equipment, by the base station, the downlink control channel scheduled according to the parameter set in a repetitive form.

Specifically, the parameter set sent to the user equipment comprises a repetition level, a gap value and a system frame offset value of the downlink control channel.

Specifically, the parameter set further comprises a sub-frame offset value information to determine the start time of a sub-frame of the downlink control channel.

Specifically, the sub-frame offset information comprises a seed of a pseudo random number, a value related to cell radio network identity, or a sub-frame number within a system frame.

Specifically, the said parameter set is transmitted to the user equipment in physical layer, MAC layer or RRC layer signaling packet(s).

Specifically, the method further comprises scheduling the downlink control channel with a single repetition level or multiple repetition levels in a single sub-frame.

Specifically, the method further comprises receiving, by the base station, feedback from the user equipment confirming the correct reception of the downlink control channel; and terminating, by the base station, said sending the downlink control channel to the user equipment.

One embodiment of the present application provides a base station configured to perform any one of the methods disclosed above.

Another embodiment of the present application provides a method comprising receiving, by a user equipment, from a base station a parameter set and downlink control channel scheduled according to the parameter set in a repetitive form; and calculating, by the user equipment, the start time of the downlink control channel according to the parameter set received.

Specifically, the start time contains start system frame number and start sub-frame number information of the downlink control channel.

Specifically, the start system frame number of the downlink control channel is determined by a function $SFN_i=f(r, m, n)$, where r, m, n represents the repetition level, the gap value and the offset value of the downlink control channel, respectively, $SFN_i$ represents the i-th system frame number.

Specifically, said calculating of the start sub-frame number comprises deriving the start sub-frame number based on a seed of a pseudo random number, or a value related to a cell radio network temporary identity, or a pre-determined sub-frame number within a radio frame designated by the base station.

Specifically, the start time of the downlink control channel is determined by a function $SF_i=f(r, m, n)$, where $SF_i$ is the i-th sub-frame number derived from the j-th system frame number $SFN_j$ using $SF_i=SFN_j*10+LS_j$, where $LS_j$ is a sub-frame number within $SFN_j$, where $LS_j=0$ to 9.

Specifically, the method further comprises combining the repetitive downlink control channel and decoding the combined downlink control channel.

Specifically, the method further comprises sending the feedback information to confirm or reject the reception of the downlink control channel.

Specifically, when the feedback information indicates correct reception of the downlink control channel, the user equipment terminates said receiving the downlink control channel.

One embodiment of the present application provides a user equipment configured to perform any one of the methods disclosed above.

Determination of the start time of the (E)PDCCH is useful for power saving from the blind decoding for battery-limited MTC devices. Further, repetitions of (E)PDCCH improves the reliability of the downlink control channel and consequently improves the system capacity.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied. It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Figure 1:
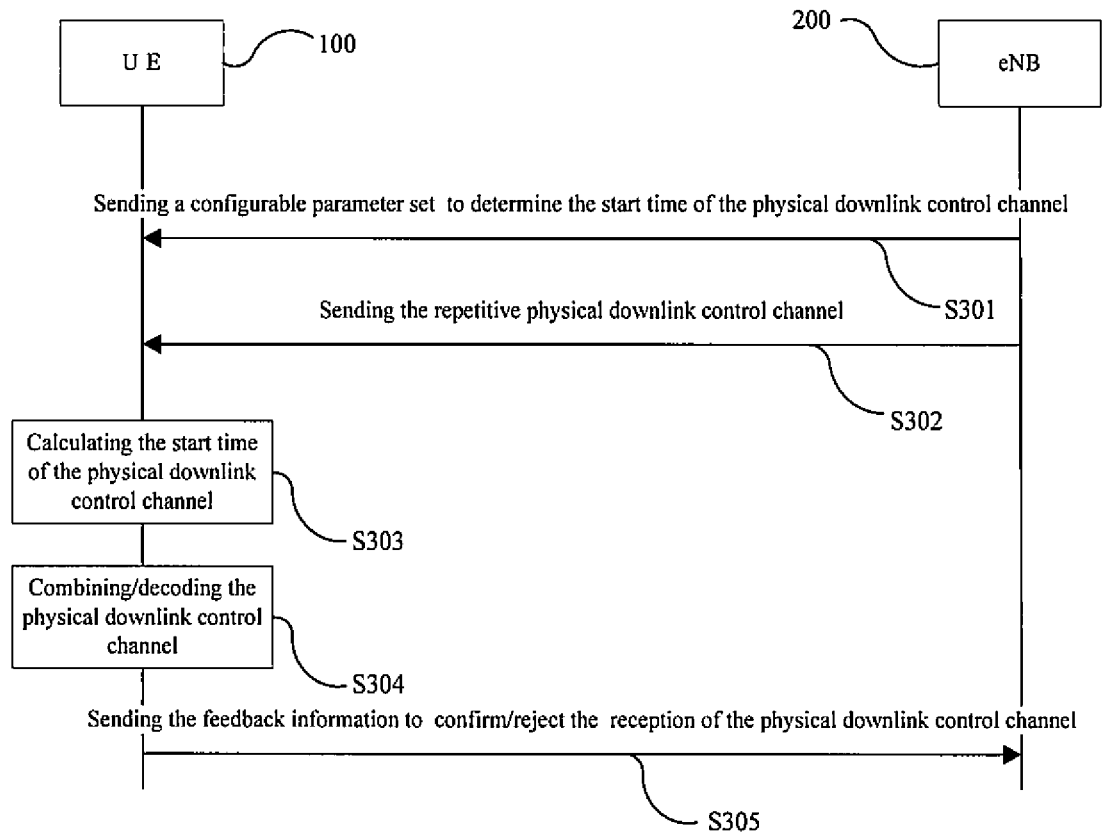
FIG. 1 shows a procedure of the start time determination of the (E)PDCCH according to one embodiment of the present invention.

FIG. 1 shows a procedure of the start time determination of the (E)PDCCH according to one embodiment of the present invention.

In FIG. 1, the UE 100 is within the coverage of an eNB 200. By measuring and reporting the UL and DL transmissions, the eNB 200 determines the repetition level of the (E)PDCCH.

In S301, the eNB 200 transmits the repetition level denoted by a natural number $r_k$ in any feasible format of the downlink transmission prior to the (E)PDCCH transmission to the UE 100. The repetition level $r_k$ refers a number of repetitions to be used to transmit the same (E)PDCCH to the UE 100. The repetition level $r_k$ may be a UE specific value.

In S301, the eNB 200 also transmits the gap value denoted by a natural number $m_k$ in any feasible format of the downlink transmission prior to the (E)PDCCH transmission to the UE 100. The gap value $m_k$ defines the interval between two repetitive transmission occasions of the (E)PDCCH. The gap value $m_k$ may be a cell specific value.

In S301, the eNB 200 also transmits the offset value denoted by a natural number $n_k$ in any feasible format of the downlink transmission prior to the (E)PDCCH transmission to UE 100. The offset value $n_k$ defines the timing offset to the $1^{st}$ sub-frame in a radio frame for the transmission of the (E)PDCCH. The offset value may be a cell specific value.

In one embodiment, the eNB 200 also transmits information to derive the sub-frame offset value in any feasible format of the downlink transmission prior to the (E)PDCCH transmission to the UE 100. The sub-frame offset value defines timing offset to the $1^{st}$ sub-frame of the (E)PDCCH. The sub-frame offset value may be derived from a pseudo random number whose seed may be known by the UE 100 and the eNB 200, or a value calculated based on the Cell Radio Network Temporary Identity (C-RNTI), or a sub-frame number of a radio frame, but not limited to these three approaches. As an example, the eNB 200 may transmit a seed of the pseudo random number to facilitate the UE 100 to derive the sub-frame offset value.

Any other parameters which help to determine the start time of the (E)PDCCH may be included in the parameter set in S301 in any feasible format prior to the (E)PDCCH transmission. As one example, the parameter set in S301 is transmitted in broadcasted or dedicated signaling transmission. As one example, the parameter set in S301 is transmitted in RRC (Radio Resource Control) message(s).

In addition, the parameter set in S301 to facilitate the UE 100 to determine the start time of the (E)PDCCH can be transmitted in one or several signaling messages which may be transmitted prior to the (E)PDCCH transmission.

In S302, the eNB 200 transmits the (E)PDCCH in the placements derived from the parameter set of the (E)PDCCH transmission in S301.

In S303, when the eNB 200 transmits the (E)PDCCH, the start System Frame Number (SFN) of the (E)PDCCH is determined by a function $$SFN_i = f(r_k, m_k, n_k) \quad (1)$$

where $SFN_i$ is the i-th radio frame carrying the (E)PDCCH within the SFN cycle of 4096, $r_k$ defines the repetition level of the (E)PDCCH, $m_k$ defines a gap value between two repetitive transmission occasions of the (E)PDCCH, $n_k$ defines the timing offset to the $1^{st}$ radio frame of the (E)PDCCH.

In one embodiment, a mod function is used to determine the start SFN which is the argument to satisfy $$(SFN_i + n_k) \mod \left( \lceil \frac{r_k}{10} \rceil + m_k \right) = 0 \quad (2)$$

The unit of gap value and offset value in Equation 2 may be one radio frame.

In addition to the mod function in Equation 2, the sub-frame number carrying the (E)PDCCH is determined by a sub-frame offset value. The sub-frame offset value may be derived from a pseudo random number whose seed may be known by the UE 100 and the eNB 200, or a value calculated based on the Cell Radio Network Temporary Identity (C-RNTI), or an explicit sub-frame index of a radio frame.

In an embodiment, the start SFN and sub-frame determination is combined in one function as $$(SF_i + n_k) \mod (r_k + m_k) = 0 \quad (3)$$

where $SF_i$ is the i-th sub-frame within the SFN cycle which is derived from the $SFN_j$ as $$SF_i = SFN_j * 10 + LS_j \quad (4)$$

where $LS_j$ is the local sub-frame number within $SFN_j$ and $LS_j = 0$ to 9. The unit of the gap value m and offset value n in Equation 3 is one sub-frame length.

Figure 2:
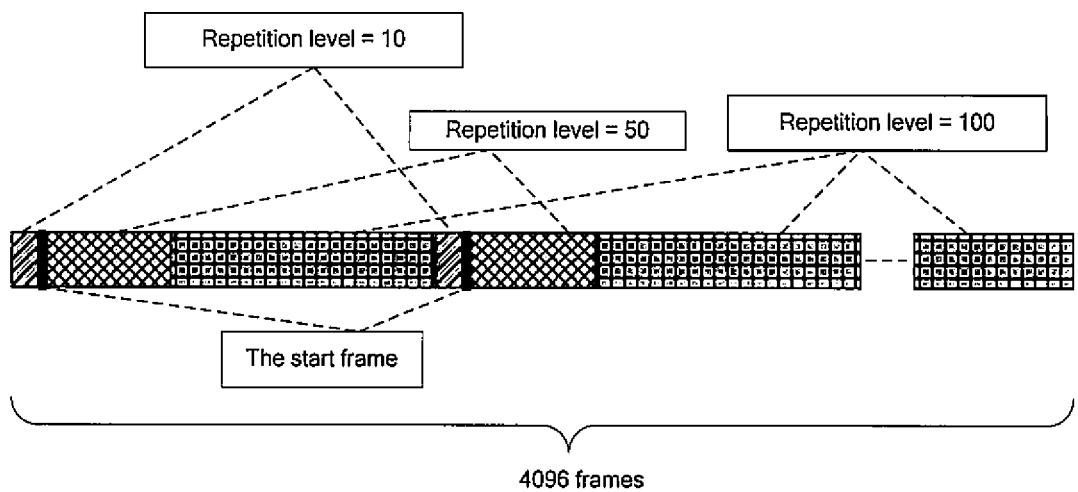
FIG. 2 shows the transmission the (E)PDCCH with the same repetition level in a sub-frame.

In an embodiment, the eNB 200 configures three repetition levels as 10, 50 and 100 repetitions of (E)PDCCHs. The eNB 200 schedules the (E)PDCCH with a single repetition level in a single sub-frame. The (E)PDCCHs with different repetition levels are scheduled in the consecutive sub-frames as illustrated in FIG. 2. As one example, the (E)PDCCH of the UE(s) with a repetition level of 10 is scheduled in the $1^{st}$ sub-frame, the (E)PDCCH of the UE(s) with a repetition level of 50 is scheduled in the $2^{nd}$ to n-th consecutive sub-frame and the (E)PDCCH of the UE(s) with a repetition level of 100 is scheduled in the n+1-th to the m-th consecutive sub-frame(s).

Figure 3:
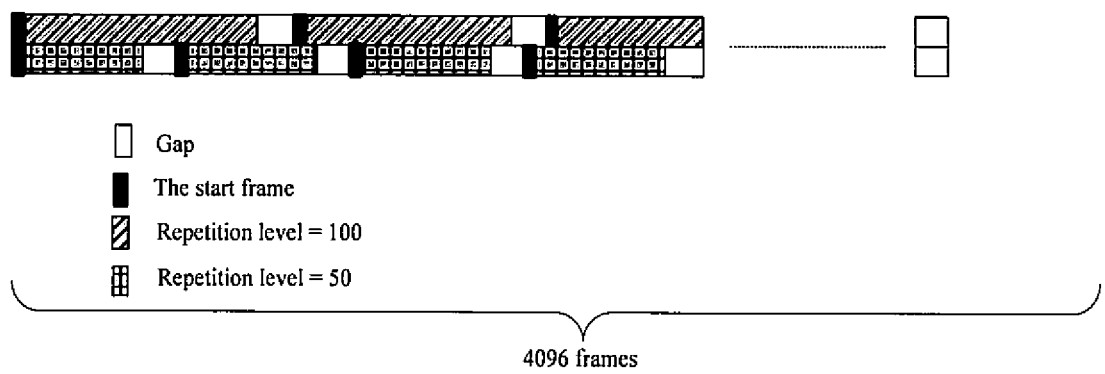
FIG. 3 shows the transmission the (E)PDCCH with the different repetition levels in a sub-frame.

In another embodiment, the eNB 200 configures two repetition levels as 50 and 100 repetitions. The eNB schedules the (E)PDCCH of the UE(s) with repetition level of 50 in l-th sub-frame to l+3-th sub-frame. The eNB schedules the (E)PDCCH of the UE(s) with repetition level of 100 in l-th sub-frame to l+5-th sub-frame. The (E)PDCCHs with different repetition levels are scheduled in the same sub-frame as illustrated in FIG. 3. l is determined by the C-RNTI mod 10 as an example, or l is determined by a pseudo random number, or l is determined by a pre-defined number which may be known by the eNB 200 and the UE 100.

In S303, upon receiving the parameter set sent by the eNB 200, the UE 100 tests the SFN in equation (2) or (3). Once a SFN meets the condition of the equation (2) or (3), UE 100 attempts to receive the (E)PDCCH from the eNB 200.

In S304, the UE 100 may combine the repetitive (E)PDCCHs and decode the (E)PDCCH at latest when the maximum number of repetition is approached.

Optionally in S305, the UE 100 may send the feedback information to eNB 200 to confirm/reject the correct reception of the (E)PDCCH. The UE 100 may stop detecting the following repetitive (E)PDCCH(s) if feedback information confirms the correct reception of the (E)PDCCH. The eNB 200 may stop transmitting the (E)PDCCH if the feedback information sent by the UE 100 confirms the correct reception of the (E)PDCCH.

Once at least one parameter in the parameter set is reconfigured, the eNB 100 may send the (E)PDCCH in new placements according to the new parameter set in S301. The UE 100 re-calculates the start time of the (E)PDCCH in S303 according to the new parameter set in S301.

In one embodiment, a base station such as eNB 200 may be configured to perform steps S301 and S302 as well as the scheduling of the (E)PDCCH according to the parameter set in a repetitive form.

In another embodiment, a user equipment such UE 100 may be configured to perform steps S303-S305.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method, comprising:
sending, by a base station, a configurable parameter set to a user equipment to be used in determining locations of a starting sub-frame of a downlink control channel that is repeatedly transmitted for the user equipment; and
sending to the user equipment, by the base station, the downlink control channel scheduled according to the configurable parameter set;
wherein the configurable parameter set sent to the user equipment comprises a repetition level and sub-frame offset information to determine the locations of the starting subframe of the downlink control channel.

2. The method according to claim 1, wherein the configurable parameter set sent to the user equipment comprises a gap value, or a system frame offset value of the downlink control channel.

3. The method according to claim 1, wherein the sub-frame offset information comprises a seed of a pseudo random number, a value related to cell radio network identity, or a sub-frame number within a system frame.

4. The method according to claim 1, wherein the configurable parameter set is transmitted to the user equipment in physical layer, MAC layer or RRC layer signaling packet(s).

5. The method according to claim 1, further comprising scheduling the downlink control channel with a single repetition level or multiple repetition levels in a single sub-frame.

6. The method according to claim 1, further comprising:
receiving, by the base station, feedback from the user equipment confirming the correct reception of the downlink control channel; and
terminating, by the base station, said sending the downlink control channel to the user equipment.

7. A method, comprising:
receiving, by a user equipment, from a base station, a parameter set;
calculating, by the user equipment, locations of a starting sub-frame of a downlink control channel that is repeatedly transmitted for the user equipment according to the parameter set received; and
receiving the downlink control channel scheduled according to the parameter set;
wherein the parameter set comprises a repetition level and sub-frame offset information; and
wherein the locations of the starting sub-frame of the downlink control channel are calculated according to the repetition level and the sub-frame offset information.

8. The method according to claim 7, wherein the parameter set is received in physical layer, MAC layer, or RRC layer signaling.

9. The method according to claim 7, wherein the locations of the starting sub-frame of the downlink control channel are determined based on a gap value, and an offset value of the downlink control channel.

10. The method according to claim 9, wherein the locations of the starting sub-frame are determined based on a seed of a pseudo random number, or a value related to a cell radio network temporary identity, or a pre-determined sub-frame number within a radio frame designated by the base station.

11. The method according to claim 7, wherein the locations of the starting sub-frame of the downlink control channel are determined by a function $$SF_i = f(r, m, n)$$

where $SF_i$ is the i-th sub-frame number derived from the j-th system frame number $SFN_j$ using $$SF_i = SFN_j * 10 + LS_j$$

where $LS_j$ is a sub-frame number within $SFN_j$, where $LS_j = 0$ to 9.

12. The method according to claim 7, further comprising combining the downlink control channel received in repetition and decoding the combined downlink control channel.

13. The method according to claim 7, further comprising sending feedback information to confirm or reject reception of the downlink control channel.

14. The method according to claim 13, wherein when the feedback information indicates correct reception of the downlink control channel, the user equipment terminates said receiving the downlink control channel.

15. A base station comprising:
at least one processor;
and at least one memory including computer program code;
the at least one memory and the computer program code configured to, with the at least one processor, cause the base station to:
send a configurable parameter set to a user equipment to be used in determining locations of a starting sub-frame of a downlink control channel that is repeatedly transmitted for the user equipment; and
send, to the user equipment, the downlink control channel scheduled according to the configurable parameter set;
wherein the configurable parameter set sent to the user equipment comprises a repetition level and sub-frame offset information to determine the locations of the starting subframe of the downlink control channel.

16. A user equipment comprising:
at least one processor;
and at least one memory including computer program code;
the at least one memory and the computer program code configured to, with the at least one processor, cause the user equipment to:
receive, from a base station, a parameter set comprising a repetition level and sub-frame offset information to determine the locations of the starting subframe of the downlink control channel;
calculate locations of a starting sub-frame of a downlink control channel that is repeatedly transmitted for the user equipment according to the repetition level and the sub-frame offset information; and
receive the downlink control channel scheduled according to the parameter set.

17. The method according to claim 1, wherein the repetition level comprises a number of repetitions to be used to transmit a same enhanced physical downlink control channel to the user equipment.

18. The method according to claim 13, wherein in response to the feedback information indicating correct reception of the downlink control channel, the user equipment terminates said receiving the downlink control channel.

* * * * *